United States Patent [19]
Guenther

[11] Patent Number: 5,613,222
[45] Date of Patent: Mar. 18, 1997

[54] CELLULAR TELEPHONE HEADSET FOR HAND-FREE COMMUNICATION

[75] Inventor: Donald E. Guenther, Chesterfield, Mo.

[73] Assignee: The Creative Solutions Company, Clayton, Mo.

[21] Appl. No.: 254,379

[22] Filed: Jun. 6, 1994

[51] Int. Cl.[6] ............................... H04B 1/38; H04M 1/05
[52] U.S. Cl. ........................ 455/89; 455/90; 379/430; 381/183
[58] Field of Search ............................ 455/89, 90, 344, 455/347–351; 379/430–433; 381/183, 187, 154

[56] References Cited

U.S. PATENT DOCUMENTS

| 286,737 | 10/1883 | Shepherd . | |
|---|---|---|---|
| 299,300 | 5/1884 | Warth . | |
| 520,467 | 5/1894 | Weber . | |
| 920,277 | 5/1909 | Creveling . | |
| 989,814 | 4/1911 | Schwarzhaupt . | |
| 1,189,490 | 7/1916 | Sanders . | |
| 1,302,887 | 5/1919 | Weil . | |
| 1,541,121 | 6/1925 | Doble . | |
| 1,558,877 | 10/1925 | Hipwell . | |
| 1,654,193 | 12/1927 | Steuart . | |
| 3,548,118 | 12/1970 | Hutchings | 179/156 |
| 3,830,334 | 8/1974 | Costa | 181/31 B |
| 3,887,771 | 6/1975 | Spanel | 179/1 C |
| 3,993,879 | 11/1976 | Larkin | 179/156 A |
| 4,090,042 | 5/1978 | Larkin | 179/156 A |
| 4,243,851 | 1/1981 | Forney | 381/183 |
| 4,335,281 | 6/1982 | Scott et al. | 179/156 A |
| 4,754,484 | 6/1988 | Larkin et al. | 379/430 |
| 5,212,734 | 5/1993 | Tsao | 455/89 |
| 5,381,486 | 1/1995 | Ludeke et al. | 381/187 |
| 5,528,689 | 6/1996 | Chan | 379/430 |

OTHER PUBLICATIONS

"The Teleconnect Magazine" Article Cellular Headset p. 119 Mar. 1991.

Primary Examiner—Reinhard J. Eisenzopf
Assistant Examiner—Thanh Le
Attorney, Agent, or Firm—Senniger, Powers, Leavitt & Roedel

[57] ABSTRACT

This invention involves a headset for use with a cellular telephone. The headset comprises an acoustical earpiece assembly adapted for the acoustical transmission of sound to the ear, a device for mounting the earpiece assembly on the head in a position adjacent an ear of a person wearing the headset, and a flexible acoustical receiving tube having an upper end connected to the earpiece assembly and a lower end attached to an acoustical receiving cup. The headset also includes a device for releasably attaching the acoustical receiving cup to a telephone in a position where the mouth of the cup is disposed closely adjacent the telephone speaker for receiving sound emitting from the speaker. The acoustical cup transmits sound to the earpiece assembly via the acoustical receiving tube. The earpiece assembly has a transmitter mechanism for picking up sounds made by a person wearing the headset, and for transmitting such sounds to the transmitter of the telephone.

16 Claims, 6 Drawing Sheets

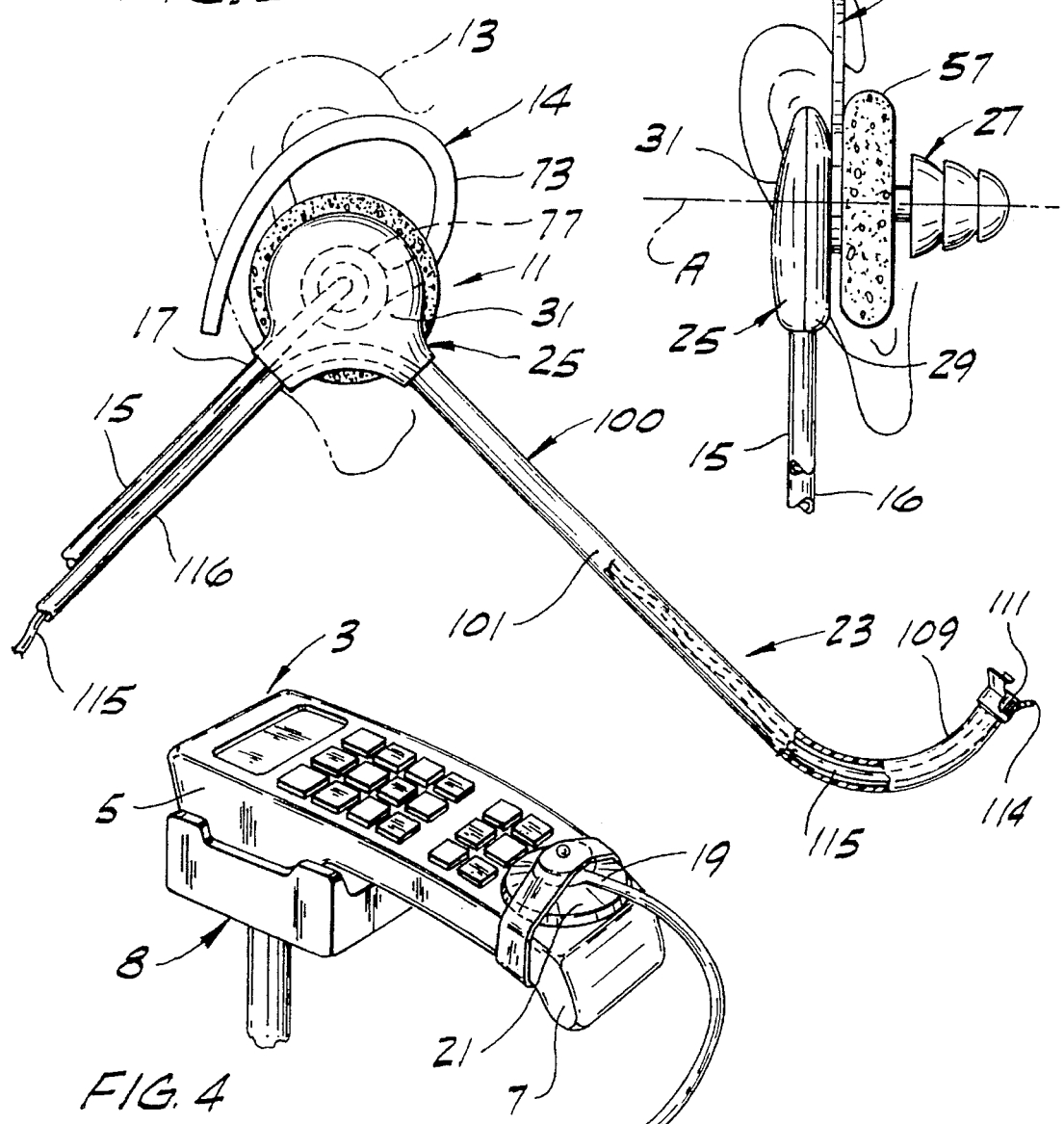

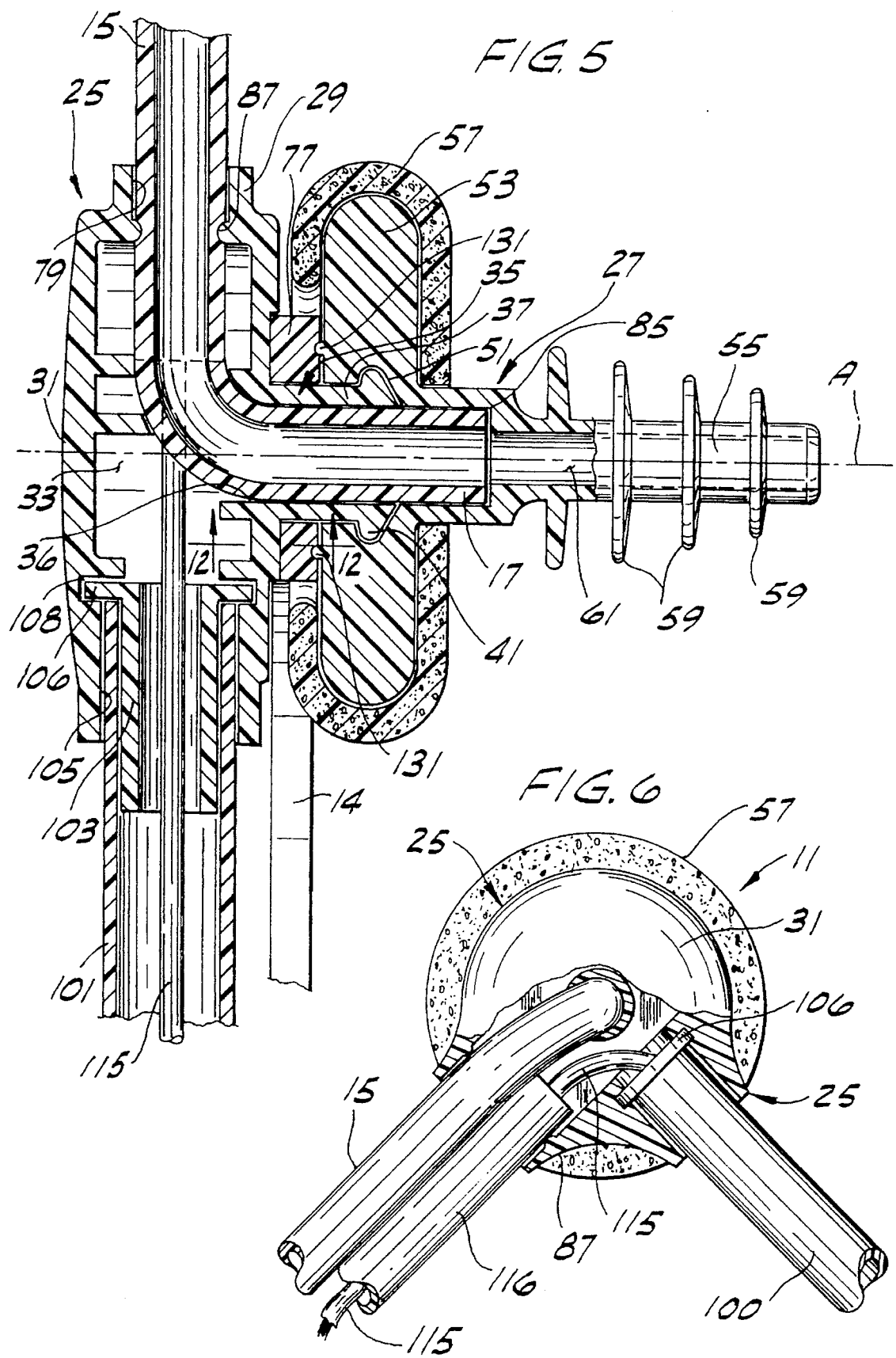

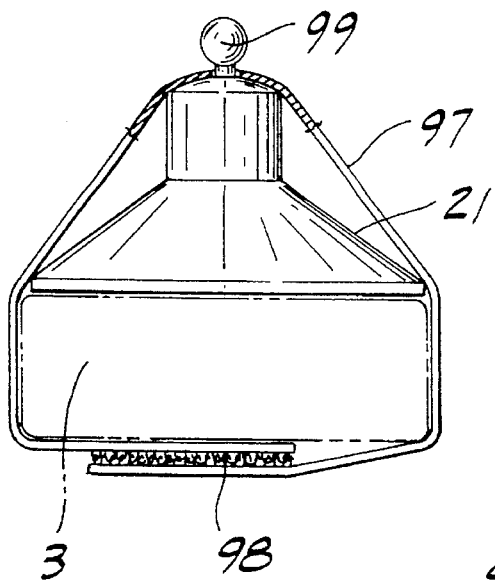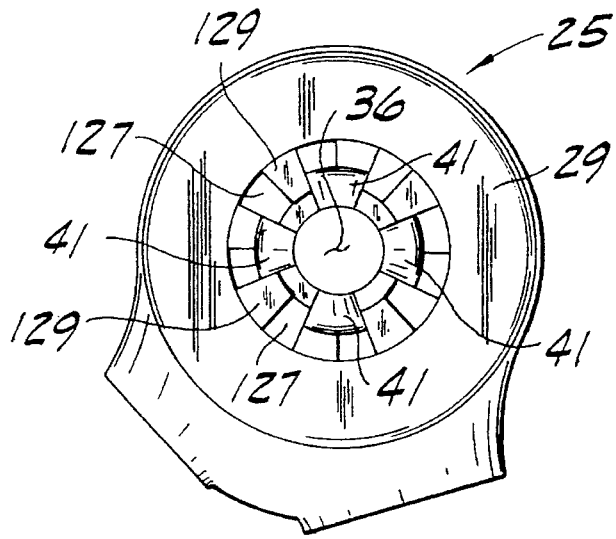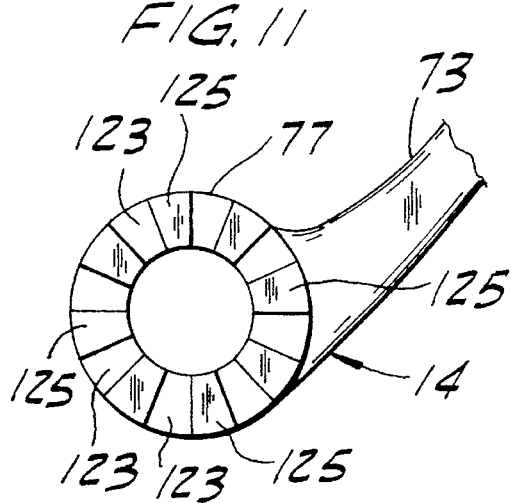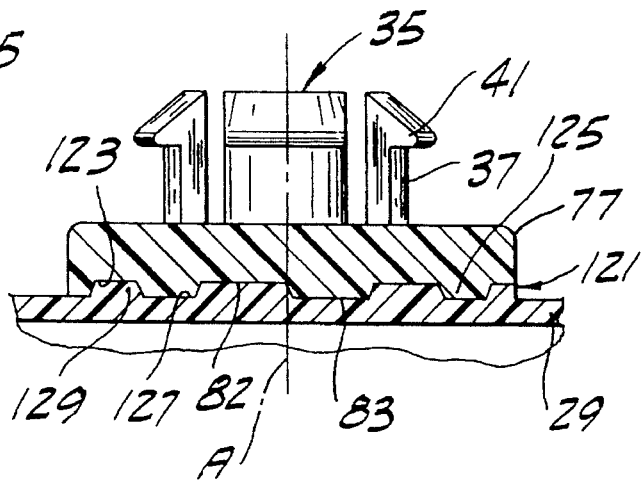

CELLULAR TELEPHONE HEADSET FOR HAND-FREE COMMUNICATION

BACKGROUND OF THE INVENTION

This invention relates generally to the cellular telephone industry, and more particularly to a headset which facilitates the use of a cellular telephone.

Conventional cellular telephones, which have become extremely popular, are cumbersome to use, especially by the driver of a vehicle. If the telephone is picked up and held by hand, the driver loses the use of that hand for driving or other purposes. In an effort to free up both hands, drivers often attempt to hold the phone between the shoulder and neck, which is not only uncomfortable but also dangerous because it restricts the full range of head movement and peripheral vision necessary for safe driving.

Some cellular telephones are operable in a "hands-free" mode, where the user of the phone speaks into a microphone (usually mounted on the sun visor on the driver's side) connected to the mechanism inside the transmitter of the telephone. While this arrangement dispenses with the need to hold the telephone, the microphone tends to pick up extraneous sounds, such as wind, engine noise, radio and traffic. This can severely impair the quality and clarity of speech transmitted by the telephone.

There is a need, therefore, for a cellular telephone system which avoids these problems.

SUMMARY OF THE INVENTION

Among the several objects of this invention may be noted the provision of a headset which facilitates the use of a cellular phone; the provision of such a headset which allows the user of the phone to converse without holding the phone; the provision of such a headset which provides for the clear transmission of speech without interference from outside environmental noise; the provision of such a headset which is lightweight, comfortable to wear and aesthetically pleasing; the provision of such a headset which does not interfere with the wearer's peripheral vision; the provision such a headset which, in one embodiment of the invention, is fabricated using no electronic components for more economical manufacture; and the provision of such a headset which is easy to connect to a phone and convenient to use.

Briefly, a headset of this invention is for use with a cellular telephone having a telephone receiver and a telephone transmitter. The headset comprises an acoustical earpiece assembly adapted for the acoustical transmission of sound to the ear, means for mounting the earpiece assembly on the head in a position adjacent an ear of a person wearing the headset, a flexible acoustical receiving tube having an upper end connected to the earpiece assembly and a lower end attached to an acoustical receiving cup. The headset comprises a device for releasably attaching the acoustical receiving cup to a telephone in a position where the mouth of the cup is disposed closely adjacent the telephone speaker for receiving sound emitting from the speaker. The acoustical cup is adapted for the acoustical transmission of sound to the earpiece assembly via the acoustical receiving tube. The earpiece assembly has a transmitter means for picking up sounds made by a person wearing the headset, and for transmitting such sounds to the transmitter of the telephone.

In a second aspect of this invention, the headset comprises an acoustical earpiece assembly, means for mounting the earpiece assembly on the head, a flexible acoustical receiving tube, an acoustical receiver, a device for releasably attaching the acoustical receiver to a telephone and a transmitter means comprising a microphone support extending forward from the earpiece assembly at one side of the head of a person wearing the headset to a position generally adjacent the mouth of the person, a microphone at the forward end of the microphone support for picking up sounds from the person, and electrical conductor means for connecting the microphone to a microphone plug associated with the transmitter of the telephone.

In a third aspect of this invention, the headset comprises an acoustical earpiece assembly, means for mounting the earpiece assembly on the head, a flexible acoustical receiving tube, an acoustical receiver, a device for releasably attaching the acoustical receiver to a telephone and a transmitter means comprising a relatively short acoustical pick-up tube extending forward from a earpiece housing at one side of the head of a person wearing the headset, and a flexible acoustical transmitting tube having an upper end connected to the earpiece housing and communicating acoustically with said pick-up tube, and a lower end adapted to communicate acoustically with the transmitter of the telephone. The acoustical pick-up and transmitting tube are adapted to acoustically transmit sounds made by a person wearing the headset to the transmitter of the telephone. The housing is pivotable relative to the hanger about an axis extending in generally side-to-side direction with respect to the head of a person wearing the headset to enable adjustment of the position of the acoustical pick-up tube relative to the head of the person.

Other objects and features will be in part apparent and in part pointed out hereinafter.

BRIEF DESCRIPTION OF THE DRAWINGS

FIG. 2 is a side view of an earpiece assembly of the headset of FIG. 1 mounted on the ear by means of a hanger;

FIG. 3 is a front view of the earpiece assembly of FIG. 2;

FIG. 4 is a view of a cellular telephone attached to the headset, showing an acoustical receiving cup secured over the speaker of the telephone;

FIG. 5 is a cross-sectional view of the earpiece assembly of FIG. 2;

FIG. 6 is an enlarged view of the earpiece assembly of FIG. 2, parts being broken away to illustrate details;

FIG. 9 is an enlarged portion of FIG. 4 illustrating how the receiving cup is secured in place on the telephone with a Velcro® strap;

FIG. 10 is an enlarged view of a ratchet surface on the housing of the earpiece assembly of FIG. 2;

FIG. 11 is an enlarged view of the hanger of FIG. 2 showing a ratchet surface adapted to mate with the ratchet surface on the housing;

FIG. 12 is an enlarged sectional view along lines 12—12 of FIG. 5, parts being removed to show certain details;

Corresponding parts are designated by corresponding reference characters throughout the several views of the drawings.

DETAILED DESCRIPTION OF THE PREFERRED EMBODIMENT

Figure 1:
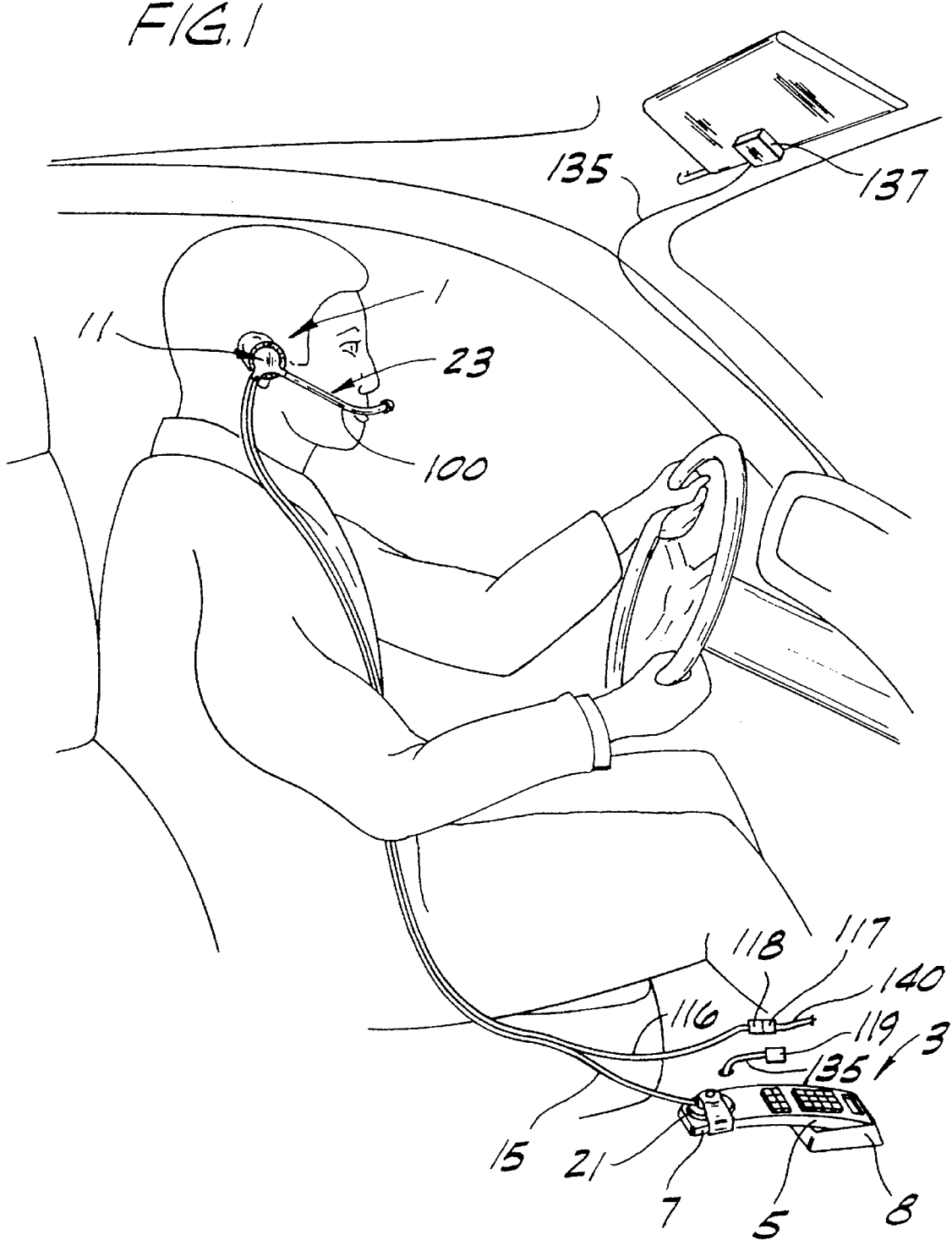
FIG. 1 shows a headset of this invention in use with a cellular telephone.

Referring now to the drawings, and first to FIG. 1, there is generally indicated at 1 a headset of this invention for use with a cellular telephone, generally designated 3. The telephone may be of any type having a receiver 5 and a transmitter 7. The telephone 3 can be used in regular fashion by holding the phone in one hand, or in a "hands-free" mode in which the telephone remains in its cradle 8, as shown. In the "hands-free" mode, the caller's voice is transmitted via a speaker 9 (FIG. 8) on the back of telephone. The headset 1 illustrated in the drawings is used when the telephone is operated in its "hands-free" mode.

The headset 1 comprises an acoustical earpiece assembly, generally indicated at 11, adapted for the acoustical transmission of sound to the ear 13 (FIG. 2), means comprising a hanger generally designated 14 for mounting the earpiece assembly on the head in a position adjacent an ear of the person wearing the headset, and a flexible acoustical receiving tube 15 having an upper end 17 connected to the earpiece assembly and a lower end 19 (FIGS. 3 and 4). An acoustical receiving cup 21 at the lower end 19 of the acoustical receiving tube is releasably attached by suitable means to the telephone 3 in a position closely adjacent to the telephone speaker 9 (FIG. 8) for receiving sound emitting from the speaker, the sound thus emitted being transmitted to the earpiece assembly 11 via the acoustical receiving tube 15 (FIG. 4). The headset 1 also includes transmitter means, generally designated 23 (FIG. 1), attached to the earpiece assembly 11 for picking up sounds made by a person wearing the headset, and for transmitting such sounds to the transmitter 7 of the telephone.

More specifically, the earpiece assembly 11 comprises a housing, generally indicated at 25, and an ear insert 27 attached to the housing adapted to be positioned in or near the outer opening of the ear 13 when the earpiece assembly 11 is mounted on the head. As shown in FIG. 5, the housing 25 is of two-part construction, comprising a first inboard part 29 disposed adjacent the ear, and a second outboard part 31 disposed away from the ear. The two parts are preferably molded from a suitable plastic (e.g., ABS plastic) and formed to snap fasten to one another so that they may be assembled without the use of mechanical fasteners. When assembled, the two housing parts 29, 31 form a chamber 33. A tubular post 35 integrally formed (molded) with the inboard part 29 of the housing 25 projects laterally from the housing toward the ear of the user. The inside of the post 35 defines a passage 36 which opens into the chamber 33 of the housing 25. The post 35 comprises a plurality of separate resilient spring fingers 37 extending the length of the post, each finger having a latch 41 at its outer end projecting generally radially outwardly with respect to the passage 36 through the post. The latches 41 on these fingers 37 are received in an annular groove 51 formed in the ear insert 27 to snap fasten the insert to the housing 25 in a position where the insert is adapted to be positioned in or near the outer opening of the ear when the earpiece assembly 11 is mounted on the head.

The ear insert 27 has a relatively large annular base 53 concentric with the post 35 on the housing 25, and a tubular stem 55 projecting from the base axially with respect to the post. The ear insert 27 is preferably of one-piece molded plastic construction and formed to snap fasten on post 35 of the housing 25 and to lock into place by means of the resilient spring fingers 37 and latches 41 described above. The annular base 53 of the ear insert 27 supports a foam cushion cover 57 which is provided for user comfort. The stem 55 of the ear insert 27 is formed with a plurality of rings 59 which function to properly position and hold the insert in the opening of the ear, and to deaden the transmission of environmental sound to the ear. The tubular stem 55 forms a passageway 61 that communicates with the passage 36 through the post 35 and the acoustic chamber 33 of the housing 25 (see FIG. 5). The ear insert 27 should be of a relatively soft flexible plastic (e.g., silicone, PVC) to avoid risk of injury to the ear.

As shown in FIGS. 2, 5 and 11 the hanger 14 for mounting the earpiece assembly 11 on the head comprises an arched section 73 configured to fit behind the ear of a person wearing the headset, and a thin flat annular hub 77 mounted on the post 35 of the housing 25 in a position sandwiched between the inboard part 29 of the housing and the base 53 of the ear insert 27. The earpiece housing 25 is pivotable relative to the hanger 14 about an axis A extending in generally side-to-side direction with respect to the head of a person wearing the headset (FIG. 5). The reason for this pivotal movement will be discussed later.

As shown best in FIG. 5, the upper end 17 of the acoustical receiving tube 15 extends through an opening 79 in the housing 25 of the earpiece assembly 11, through the chamber 33 in the housing, and through the passage 36 in the post 35 so that the end 17 of the tube is substantially coaxial with the passage 61 through the stem 55 of the ear insert 27. The end of the tube abuts against an internal annular shoulder 85 in the stem 55 having a width approximately the same as the wall thickness of the receiving tube 15 so that the passages through the receiving tube and stem 55 combine to form a continuous acoustical passageway of substantially uniform diameter. An annular rib 87 adjacent the opening 79 in the housing applies a compressive force to the receiving tube 15 to provide strain relief to assist in holding the tube in place.

Figure 7:
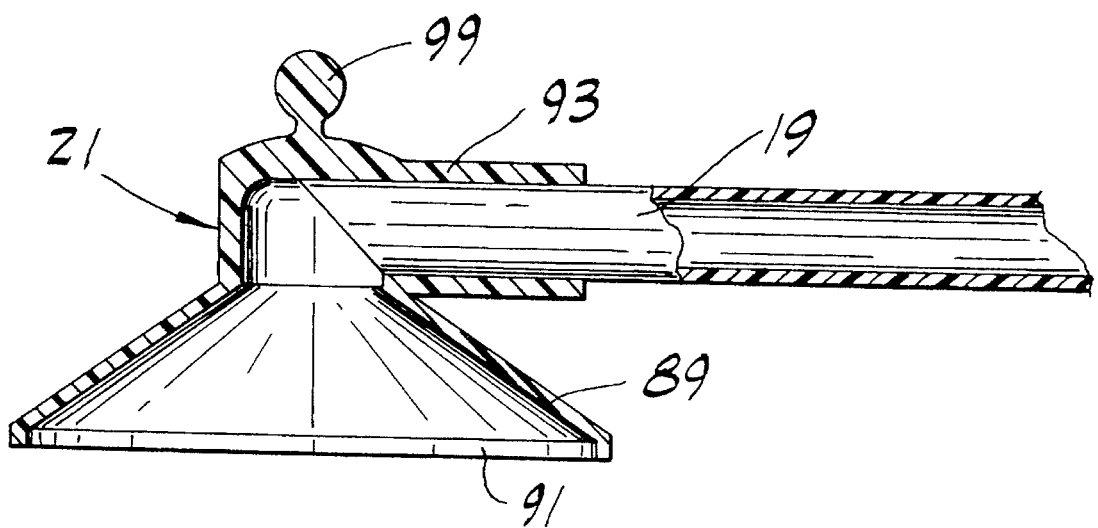
FIG. 7 is an enlarged sectional view of the acoustical receiving cup and receiving tube of FIG. 4.

The acoustical receiving cup 21 attached to the lower end of the receiving tube 15 is shown in FIG. 7. The cup 21 has a generally conical body 89 having a relatively wide, open mouth 91 adapted to be attached to the telephone 3 in a position wherein the mouth of the cup is closely adjacent the telephone speaker 9 (FIG. 8) for receiving sound emitting from the speaker. The cup 21 is formed with an integral sleeve 93 projecting laterally from the cup body 89 at its upper end. This sleeve is sized to receive the lower end 19 of the acoustical receiving tube 15, the fit being a close friction fit sufficient to hold the tube tightly within the sleeve 93. The end of the tube 15 is bevelled as shown in FIG. 7 to minimize interference with the transmission of sound from the speaker 9 of the telephone to the earpiece assembly 11.

Figure 8:
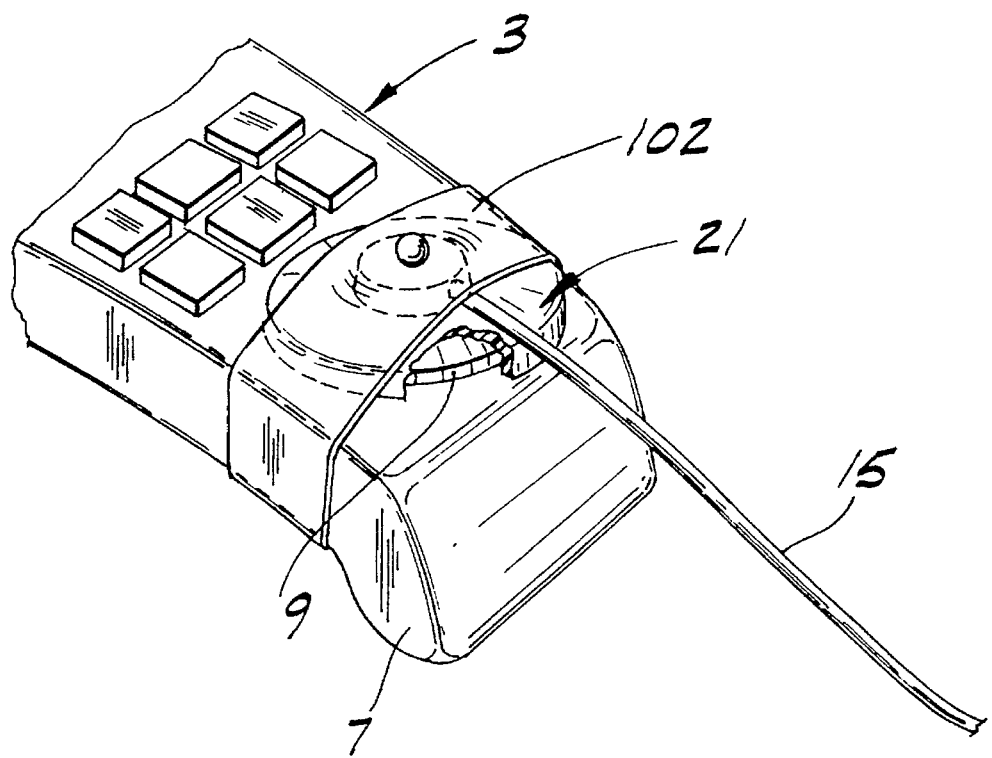
FIG. 8 is an enlarged portion of FIG. 4 illustrating how the receiving cup is secured in place on the telephone by an elastic band.

The receiving cup 21 may be attached to the telephone in any number of ways. One such way, illustrated in FIG. 9, is by the use of a strap 97 attached to the cup and having interengageable hook and loop type (Velcro®) fasteners 98 affixed thereto at opposite ends of the strap. The strap may be attached to the cup 21 by means of a boss 99 on the cup inserted through an opening in the strap. Alternatively, one or more elastic bands 102 may be used, as shown in FIG. 8. It will be understood that other means for removably attaching the cup 21 to the telephone are also suitable.

The transmitter means 23 shown in FIG. 2 comprises a J-shaped arm 100 of substantially rigid material attached to the housing 25 of the earpiece assembly 11. The arm has a straight shank portion 101, the rearward end of which has a slip fit over a connector in the form of a sleeve 103 (FIG. 5) rotatably mounted in an opening 105 in the housing 25 of the earpiece assembly 11. As shown in FIG. 5, the sleeve 103 has a circular radial flange 106 at its rearward (upper) end received in a circular groove 108 formed in the housing, the sleeve thus being held rotatably captive in the housing 25. The shank portion 101 of the arm extends forward and downward from the housing 25 at one side of the head of a person wearing the headset 1. The J-shaped arm also has a curved end portion 109 which curves laterally inwardly from the shank portion 101. The configuration of the arm 100 is such that the tip of its curved end portion 109 is positioned adjacent the mouth of a person wearing the headset.

Transmitter means 23 also includes a miniature microphone 111 supported by the J-shaped arm 100 at the tip of its forward end. This microphone 111 may be of conventional design, one such microphone being commercially available from Radio Shack under the trade designation #33-3003. A funnel-shaped sound cone 114 mounted at the forward end of the arm surrounds the microphone 111 and functions to gather sounds directed generally in the direction of the microphone for pick-up by the microphone. A microphone wire 115 extends from the microphone 111 rearwardly through the tubular arm 100, through the sleeve 103, and into the chamber 33 of the housing 25 (FIGS. 5 and 6). From there, the wire 115 passes through a flexible tube 116 running alongside the acoustical receiving tube 15 and is connected at its lower end by means of a suitable connector 118 (preferably a quick-connect, quick-disconnect connector) adapted to mate with connector 117 attached to a microphone mechanism or system 140 associated with the transmitter 7 of the telephone, as will be described later. To facilitate use of the device, and to improve appearance, the receiving tube 15 and the tube 116 housing the microphone wire 115 can be integrally joined side-by-side along much of their lengths, i.e., from a location inside the earpiece housing 25 to a location generally adjacent the telephone.

To ensure proper positioning of the microphone 111 relative to the head and mouth of the wearer of the headset 1, the J-shaped arm 100 is adjustable in two ways. First, the arm is rotatable on the longitudinal axis of its shank 101 to move the outer part 109 of the arm carrying the microphone 111 up and down relative to the mouth of the wearer. This is accomplished simply by rotating the arm 100 and the sleeve 105 on which it is mounted relative to the housing 25 (the fit of the sleeve in the housing is sufficiently tight that the arm remains in its adjusted position until forcibly moved to a different position). Second, the arm 100 and the housing 25 of the earpiece assembly 11 are conjointly rotatable on axis A relative to the ear hanger 14 (i.e., the shank 101 of the arm pivots in a generally vertical plane extending in front-to-rear direction with respect to the wearer) for adjusting the position of the arm to suit the wearer.

Indicated generally at 121 (FIG. 12) is a detent mechanism for maintaining the housing 25 and J-arm 100 in a selected position of angular adjustment. This mechanism 121 comprises a series of alternating ratchet grooves 123 and teeth 125 arranged around the central opening in the annular hub 77 of the hanger 14 on the outwardly facing surface of the hub, and a complementary series of alternating ratchet grooves 127 and teeth 129 on the opposing surface of the inboard part 29 of the housing 25. The grooves and teeth extend radially with respect to axis A. The arrangement is such that the teeth 125 on the hub are receivable in the grooves 127 on the housing, and the teeth 129 on the housing 25 are receivable in the grooves 123 on the hub (see FIG. 12) to lock the housing in a selected angular position relative to the hanger 14 according to the desired angular position of the J-arm 100 (see FIG. 12). As shown in FIG. 5, a resilient spring element 131 formed on the base 53 of the ear insert 27 resiliently urges the housing 25 and hanger hub 77 toward one another to maintain the ratchet grooves and teeth on the opposing surfaces in interengagement. The force exerted by this spring element is sufficiently weak that it can be easily overcome, if desired, to rotate the housing 25 relative to the hanger 14 to readjust the position of the J-arm 100.

To use the headset 1 of FIG. 1, the microphone wiring 115 is simply connected to the transmitter 7 of the telephone or equipment associated with transmitter. If the telephone has a conventional "hands-free" speaker feature, this simply involves disconnecting connector 119 attached to the wiring 135 of the standard hands-free microphone 137 (typically mounted on the driver's side visor) and connecting the microphone wiring 115 of the headset of this invention by means of connector 118 to preexisting connector 117 attached to the wiring 140 leading to the transmitter 7 of the telephone. Other types of connector arrangements can be used to mate with different configurations of systems associated with the transmitter 7 of a cellular telephone. In the future, cellular phones may have direct inputs to accommodate the wiring of this invention.

Figure 13:
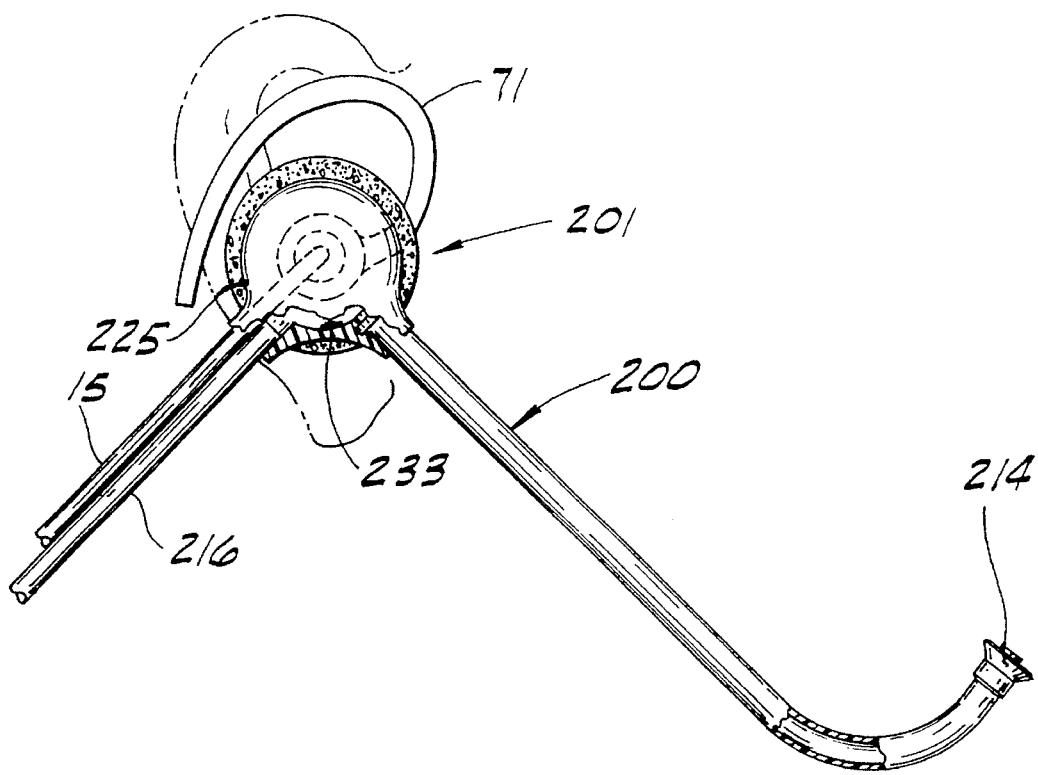
FIG. 13 is a side view of an alternative headset design using no electronic components.
Figure 14:
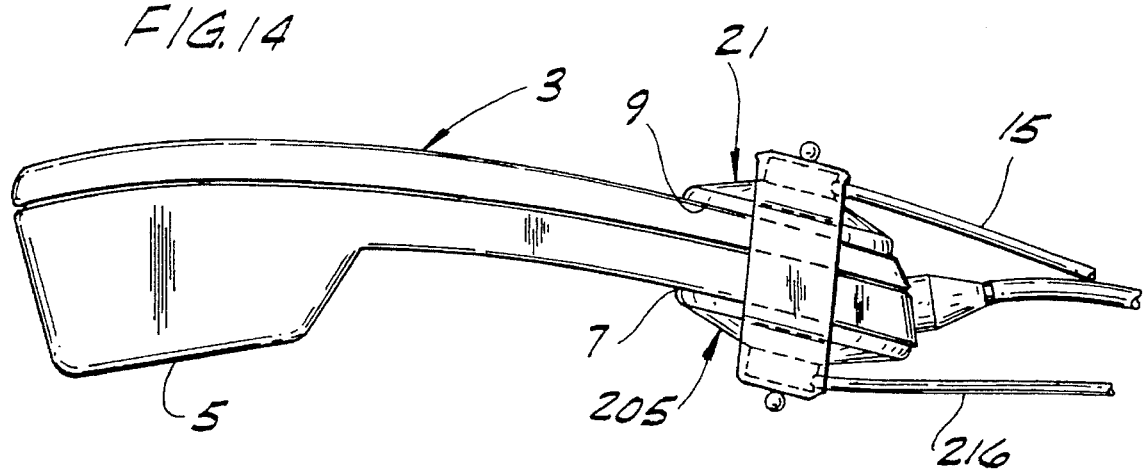
FIG. 14 is a view showing an acoustical receiving cup and sound cup of the headset of FIG. 13 secured over the speaker and transmitter, respectively, of a cellular telephone.

FIGS. 13 and 14 illustrate an alternative embodiment of the headset of the invention, generally designated 201. This embodiment is similar to the version described above, except that it includes no electronic components. That is, the microphone and associated wiring are eliminated. Sound from the wearer of the headset is transmitted acoustically through a J-shaped pick-up tube 200 having a funnel-shaped sound cone 214 at its forward end for gathering the sound and directing it into the tube. The rearward end of the tube is in acoustic communication with the chamber 233 in the housing 225, and the upper end of an acoustic transmitting tube 216 corresponding to the tube 116 of the headset of the first embodiment is in acoustic communication with the chamber 233 in the housing. The arrangement is such that sound is transmitted through the rearward end of the pick-up tube, through the acoustic chamber 233, and then down through the acoustic transmitting tube 216 to a sound cup 205 attached to the transmitting end 5 of the telephone 3, as shown in FIG. 14. This sound cup 205 is identical to the sound cup 21 described earlier and may be removably attached to the telephone in identical fashion (e.g., by a Velcro® strap 98 or an elastic band 102). The other components of the headset 201 are identical to those described in the embodiment of FIGS. 1–12, and such components are identified by the same reference numbers in FIGS. 13 and 14 where appropriate.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A headset for a cellular telephone, said cellular telephone having a speaker and a transmitter, said headset comprising:

a) an acoustical earpiece assembly adapted for the acoustical transmission of sound to the ear;

b) a device for mounting the earpiece assembly on the head in a position adjacent an ear of a person wearing the headset;

c) an acoustical receiving system comprising:

i) a flexible acoustical receiving tube having an upper end connected to said earpiece assembly, and a lower end;

ii) an acoustical receiver attached to the lower end of the acoustical receiving tube; and iii) a device for releasably attaching the acoustical receiver to said telephone in a position where the receiver is disposed for receiving sound emitting from the speaker of the telephone, said acoustical receiver being adapted for the acoustical transmission of said sound to said earpiece assembly via said acoustical receiving tube; and d) electrical transmitter means attached to the earpiece assembly for picking up sounds made by the person wearing the headset, and for transmitting such sounds to the transmitter of the telephone, said electrical transmitter means including a microphone support extending forward from the earpiece assembly at one side of the head of the person wearing the headset to a position generally adjacent the mouth of the person, a microphone at the forward end of the support, and electrical conductor means for connecting the microphone to a microphone mechanism associated with the transmitter of the telephone;

said acoustical receiving system being operable to transmit sound acoustically from the speaker of the telephone to the ear, and said electrical transmitter means being operable to transmit sound electronically from the person wearing the headset to the transmitter of the telephone.

2. A headset as set forth in claim 1 wherein said receiver comprises an acoustical receiving cup having a relatively wide, open mouth and said device for releasably attaching the acoustical receiving cup to the telephone comprises a Velcro strap for extending generally around a transmitter portion of the telephone.

3. A headset as set forth in claim 1 wherein said receiver comprises an acoustical receiving cup having a relatively wide, open mouth and said device for releasably attaching the acoustical receiving cup to the telephone comprises an elastic band for extending generally around a transmitter portion of the telephone.

4. A headset as set forth in claim 1 wherein said earpiece assembly comprises a housing, an ear insert attached to the housing adapted to be positioned in or near the outer opening of the ear when the earpiece assembly is mounted on the head, and a cushion interposed between the housing and the ear insert, the upper end of said acoustical receiving tube being connected to the housing and communicating acoustically with the ear insert for transmission of sound to the ear.

5. A headset as set forth in claim 4 further comprising a snap fastener for snap fastening said ear insert to the housing.

6. A headset as set forth in claim 4 wherein said microphone support comprises a shank portion extending forward from the housing at one side of the head of the person wearing the headset, and a forward end portion extending generally laterally with respect to the shank portion, the shank portion having a connection with the housing permitting rotation of the microphone support about a longitudinal axis of the shank portion thereby to permit adjustment of the position of the forward end portion of the microphone support relative to the mouth of the person wearing the headset.

7. A headset as set forth in claim 6 wherein said earpiece assembly further comprises a connector connecting the shank portion of the microphone support to the housing, said housing comprising two separate parts adapted to snap-fasten together to form the housing, said housing being configured to hold said connector rotatably captive with respect to the housing when the two parts of the housing are snap fastened together.

8. A headset as set forth in claim 4 wherein said device for mounting the earpiece assembly on the head comprises a hanger on the housing engageable with the ear for supporting the earpiece assembly on the ear.

9. A headset as set forth in claim 1 further comprising a flexible transmitting tube through which said electrical conductor means extends, said flexible transmitting and receiving tubes being integrally connected in side-by-side relation.

10. A headset as set forth in claim 1 wherein said earpiece assembly comprises a housing defining an acoustical chamber, and an ear insert attached to the housing adapted to be positioned in or near the outer opening of the ear when the earpiece assembly is mounted on the head, the upper end of said acoustical receiving tube being connected to the housing and communicating acoustically with the ear insert for transmission of sound to the ear.

11. A headset as set forth in claim 10 further comprising a snap fastener for snap fastening said ear insert to the housing.

12. A headset as set forth in claim 10 wherein said means for mounting the earpiece assembly on the head comprises a hanger on the earpiece housing engageable with the ear for supporting the earpiece assembly on the ear.

13. A headset as set forth in claim 12 wherein said earpiece housing is pivotable relative to said hanger about an axis extending in generally side-to-side direction with respect to the head of a person wearing the headset to enable adjustment of the position of the forward end of the microphone support relative to the mouth of said person.

14. A headset as set forth in claim 13 further comprising a detent mechanism for maintaining the earpiece housing in a selected position of angular adjustment.

15. A headset as set forth in claim 1 further comprising a quick-connect, quick-disconnect coupling for releasably coupling said electrical conductor means to said microphone mechanism associated with the transmitter of the telephone.

16. A headset as set forth in claim 1 wherein said earpiece assembly comprises a housing and wherein said microphone support comprises a tubular arm having a rearward end connected to said housing, said electrical conductor means extending rearwardly from said microphone through said tubular arm and through said housing for connection to said microphone mechanism.

\* \* \* \* \*